(12) United States Patent
Barthel

(10) Patent No.: US 6,327,934 B1
(45) Date of Patent: Dec. 11, 2001

(54) FRONT-AXLE OUTPUT OF AN AUTOMATIC TRANSMISSION

(75) Inventor: Lothar Barthel, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/462,241

(22) PCT Filed: Aug. 6, 1998

(86) PCT No.: PCT/EP98/04901

§ 371 Date: Jan. 5, 2000

§ 102(e) Date: Jan. 5, 2000

(87) PCT Pub. No.: WO99/07570

PCT Pub. Date: Feb. 18, 1999

(30) Foreign Application Priority Data

Aug. 12, 1997 (DE) .............................. 197 34 858

(51) Int. Cl.⁷ .................. F16H 57/02; B25G 3/28
(52) U.S. Cl. .............. 74/607; 403/359.1; 403/374.3; 464/177
(58) Field of Search ................ 74/607; 403/359.1, 403/374.3; 464/177

(56) References Cited

U.S. PATENT DOCUMENTS

| | | | |
|---|---|---|---|
| 2,650,484 | * | 9/1953 | Bujak ..................... 403/359.4 X |
| 2,773,369 | | 12/1956 | Klemm . |
| 3,323,389 | | 6/1967 | Hause . |
| 3,550,474 | | 12/1970 | Jean et al. . |
| 4,043,146 | * | 8/1977 | Stegherr et al. ............. 464/177 |
| 4,606,671 | * | 8/1986 | Rasmussen ................. 74/607 X |
| 4,976,668 | * | 12/1990 | Ashikawa et al. ........... 74/607 X |
| 5,279,186 | | 1/1994 | Martin et al. . |

FOREIGN PATENT DOCUMENTS

| | | |
|---|---|---|
| 10 72 485 | 12/1959 | (DE) . |
| 21 10 012 A | 9/1972 | (DE) . |
| 38 41 818 A1 | 6/1989 | (DE) . |
| 04 73 202 A1 | 3/1992 | (EP) . |
| 2 052 220 A | 4/1971 | (FR) . |
| 912 675 A | 12/1962 | (GB) . |
| 1 078 720 A | 8/1967 | (GB) . |

OTHER PUBLICATIONS

*Revue Technique Automobile*, "Audi A4; Transmissions automatique", vol. 51, No. 581 dated Feb. 1996, pp. 66–73, XP002088901 Boulogne–Billancourt, FR. (to follow).
Föerster, Hans Joachim, "Automatische Fahrzeuggetrieb", Germany: Springer–Verlag, XP002088902, pp. 472–473, Figs. 14.37A–C.

* cited by examiner

*Primary Examiner*—Allan D. Herrmann
(74) *Attorney, Agent, or Firm*—Davis & Bujold, P.L.L.C.

(57) ABSTRACT

A front-axle output of an automatic transmission having situated in a sealed housing (15) a front-axle spur pinion (1) which is operatively connected via an intermediate gear (4) with a driving gear. The output spur gear (1) is also connected for transmitting a torque to a differential (5) with a co-axially positioned pinion shaft (3A) which has one pinion engaged with the differential (5). The output spur gear (1) is designed as one piece with a side shaft (2) which is connected with the pinion shaft (3A) in an area of low bending stress between a support (10) of the pinion (3) and the pinion shaft (3A) and an output spur gear support (8).

8 Claims, 2 Drawing Sheets

FRONT-AXLE OUTPUT OF AN AUTOMATIC TRANSMISSION

BACKGROUND OF THE INVENTION

The invention relates to a front-axle output of an automatic transmission.

A front-axle transmission according to the preamble, the Applicant's 4 HP 18, has been disclosed, e.g. in the book "Automatische Fahrzeuggetriebe" by H. J. Forster, Springer Verlag 1991, page 473. This known transmission has a front-axle output configurated in a manner such that torque is transmitted, via an intermediate gear from a front-axle spur pinion, having an input gear to an output gear; each input, intermediate and output gear is designed as a spur gears. In the hub of the output gear is supported, with a positive fit, a pinion shaft of a pinion that engages a differential and is a bevel drive. Next to the support in the output-gear hub, the pinion shaft is supported in an area adjoining the pinion.

The output spur gear is supported on each side of the gear by a tapered roller bearing with an adjusting spacer. The tapered roller bearing situated upon the side remote from the differential is adapted and supported by its outer rollway body in a cover of the front-axle output housing. The outer rollway body of the other tapered roller bearing is supported in an intermediate plate disposed between the lid and the front-axle output housing, the housing being sealed with the intermediate plate.

On the side of the output gear, facing the differential or the pinion, is attached a spacer sleeve with a cup spring set and a parking interlock gear, said parts being guided via the pinion shaft. The parking interlock gear lies with an end remote from the output gear on a shaft shoulder of the pinion shaft and with its other end on the cup spring set which Is supported by the spacer sleeve on the output gear.

A disadvantage of this known solution is the great multiplicity of parts and a correspondingly high assembly expense from which high costs result from production and eventual repair works.

Therefore, the problem on which this invention is based is to provide a front-axle output of an automatic transmission which has a small number of parts, is easy and economical to assemble and has the lightest possible weight.

SUMMARY OF THE INVENTION

By virtue of the inventive development of the output spur gear with an axial extension as a side shaft, the connecting point between the pinion shaft and the output spur gear or the side shaft can be transferred to an area of low bending stress along the pinion support, it being possible to use the support already available in the area of the pinion support.

The side shaft, as well as the pinion shaft, can be dimensioned in this area with a smaller diameter or with less wall thickness than In the area of the output spur gear support and of the pinion support, since these can have a lesser bending resistance torque on the connecting point due to the transfer of their connecting point from the area of highest introduction of force and bending stress to the output spur gear support. Therefrom results the advantage of economy in material and weight, since the side shaft can be designed resistant to bending on the area adjoining the output spur gear.

Besides, the multiplicity of parts can be clearly reduced with the inventive solution, since in the support of the side shaft with the output spur gear, it is possible to omit a support on both sides of the output spur gear whereby it is possible, e.g. to spare on the side of the pinion a roller bearing with corresponding support in an intermediate plate provided precisely therefor with additional sealing points.

The considerable simplification of the construction offers the added advantage of reducing assembly and manufacturing costs.

Another simplification of the front-axle output configuration results when the side shaft is designed forming a single piece with the parking interlock gear. Thereby can be advantageously spared additional fastening elements for the parking interlock gear and the assembly thereof.

BRIEF DESCRIPTION OF THE DRAWING(S)

The invention will now be described, by way of example, with reference to the accompanying drawings in which.

DETAILED DESCRIPTION OF THE INVENTION

Figure 1:
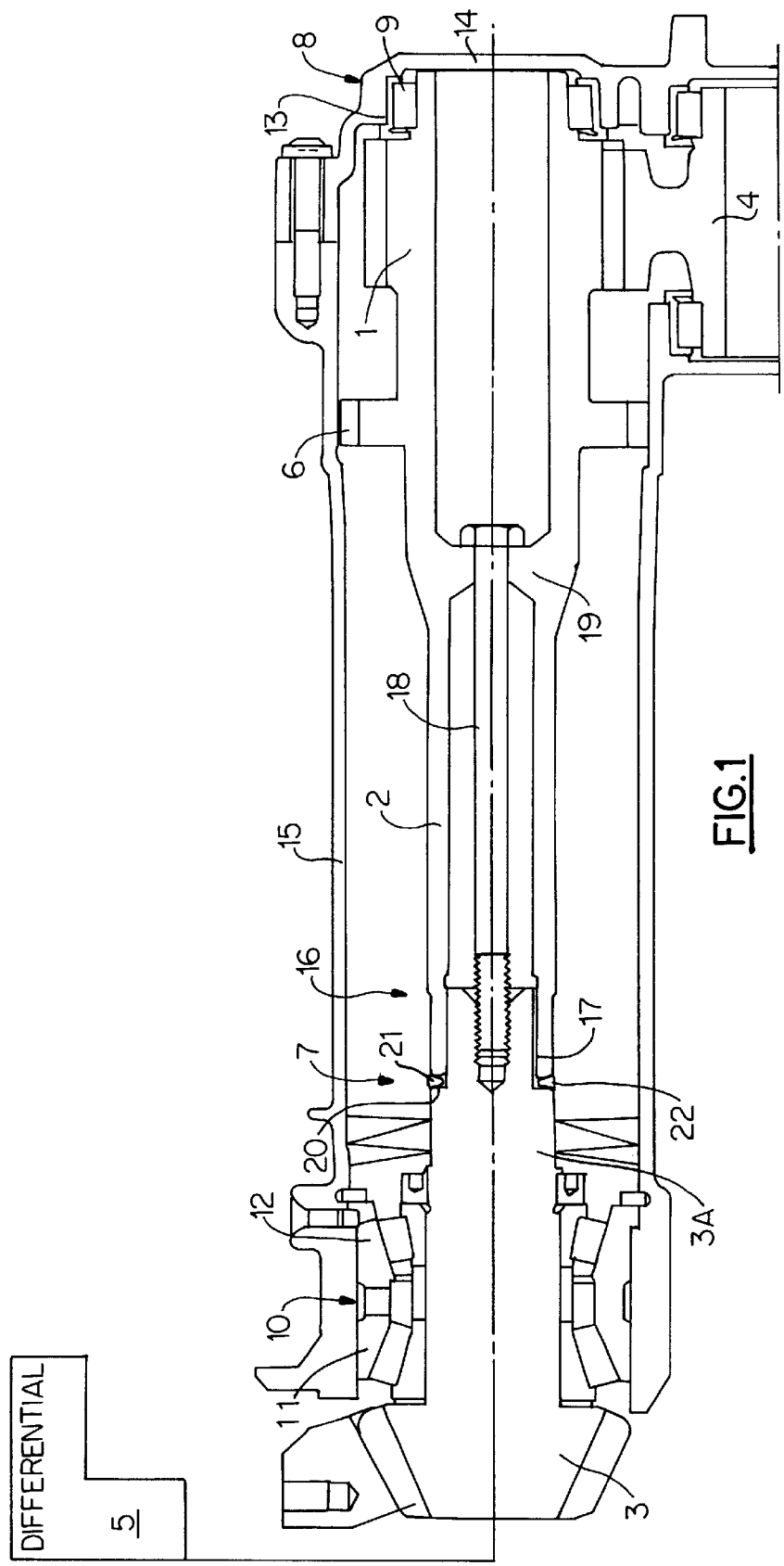
FIG. 1 is a diagrammatic cross-section of an output spur gear of a front-axle, output pinion with a side shaft connected with a pinion shaft.

In FIG. 1 is shown an output spur gear 1 of a front-axle output of an all-wheel automatic transmission designed forming a single piece with a side shaft 2 connected with a pinion shaft 3A.

The output spur gear 1 engages with its teeth in an intermediate gear connected by teeth with an input gear of a transmission output shaft (not shown in detail) and transmits an output torque of the output shaft to a differential 5 via the pinion shaft 3A and a pinion 3 designed as tapered pinion.

In the instant embodiment, the output spur gear 1 with the side shaft 2 is designed as a hollow shaft and has a parking interlock gear 6, said parking interlock gear 6 and the side shaft 2 being designed forming a single piece.

Between the output spur gear 1 and the pinion shaft 3A, the connection 7 has circumferentially a positive connection 17 and axially movable connecting element 22. The connection 7 is situated in an area of low bending stress between an output spur gear support 8, which has a cylinder roller bearing 9 and a support 10 of the pinion shaft 3A, the connection 7 lying in an area adjoining the support 10. The support 10 of the pinion shaft 3A is designed, as known per se, with two tapered roller bearings 11, 12. The cylinder roller bearing 9 of the output spur gear support 8 is located upon the side of the output spur gear 1 remote from the pinion shaft 3A, the outer rollway body 13 of the cylinder roller bearing 9 being supported in a cover 14 of a sealed housing 15.

In the connection 7 between pinion shaft 3A and side shaft 2, there is an overlapping area 16 in which the positive connection 17 is designed such that the pinion shaft 3A has a multi-groove spline which extends partly into the side shaft 2. In the overlapping area 16, a splined shaft 17 is provided, in this embodiment, as a multi-groove spline on the outer side of the pinion shaft 3A and inside shaft 2, by which the pinion shaft 3A and the side shaft 2 are non-rotatably interconnected in a telescopic state.

Since the force Is introduced in the area of the output spur gear 1, the strongest bending stress is here. For this reason, the side shaft 2 with the output spur gear 1 are given in larger dimensions in this area than in those areas situated between the output spur gear support 8 and the connection 7 with the pinion shaft 3A, the diameter and wall thickness of the side shaft 2 always further tapering downward from the output spur gear support 8 to the connecting point 7.

For axial fastening of the pinion shaft 3A on the side shaft 2, a fastening element 18 is provided which in the instant embodiment is designed as a bolt. The bolt 18 is passed through a constriction 19 which is formed in the interior of the side shaft 2 and screwed centrally into the pinion shaft 3A. The constriction serves as a stop for a head of the bolt 18 in the side shaft 2. When screwing in the bolt 18, the side shaft 2 is pressed on a step 20 of the pinion shaft 3A.

The removable axial fastening of the side shaft 2 on the pinion shaft 3A by means of the bolt 18 makes it possible, in a simple manner, to assemble the side shaft 2 with the output spur gear 1 and to be easily changed in case of subsequent damage.

At the connection 7, between the step 20 and the front face 21 of the side shaft 2, a spacer ring 22 is disposed which makes possible a centering for alignment or the pinion shaft 3A and the side shaft 2 even in case of manufacturing imprecisions.

As a result of manufacturing tolerances, there is at first, prior to tightening of the bolt 18, only a line contact between the front face 21, the spacer ring 22 and the step 20 of the pinion shaft 3A.

Figure 2:
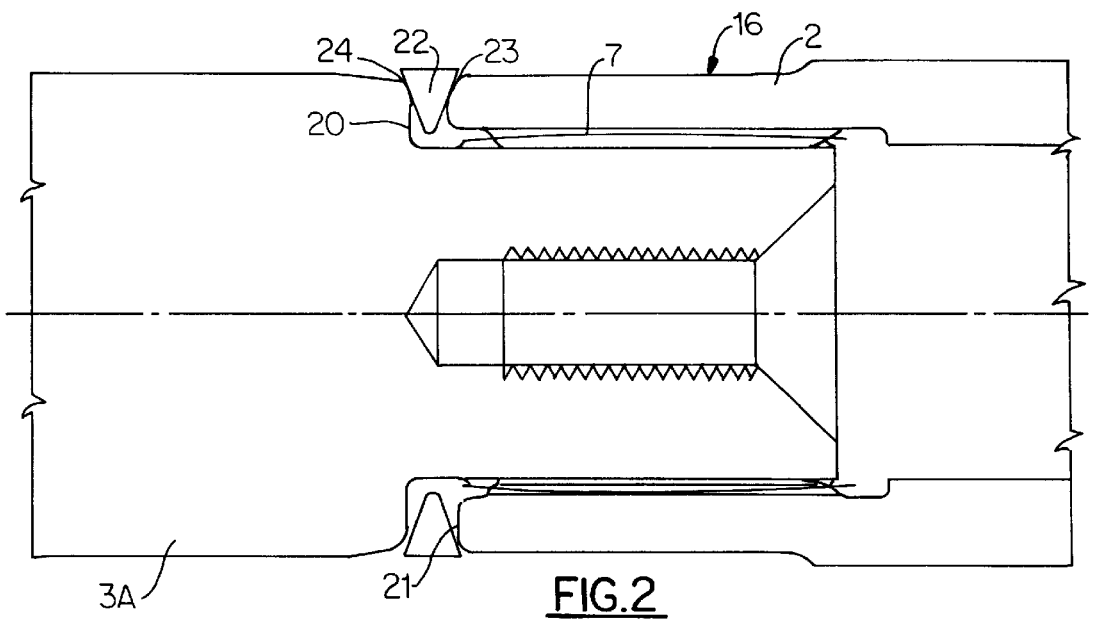
FIG. 2 is an enlarged representation of the connecting point between the side shaft and the pinion shaft with a spacer ring situated therebetween according to FIG. 1 before the fastening with a fastening element.
Figure 3:
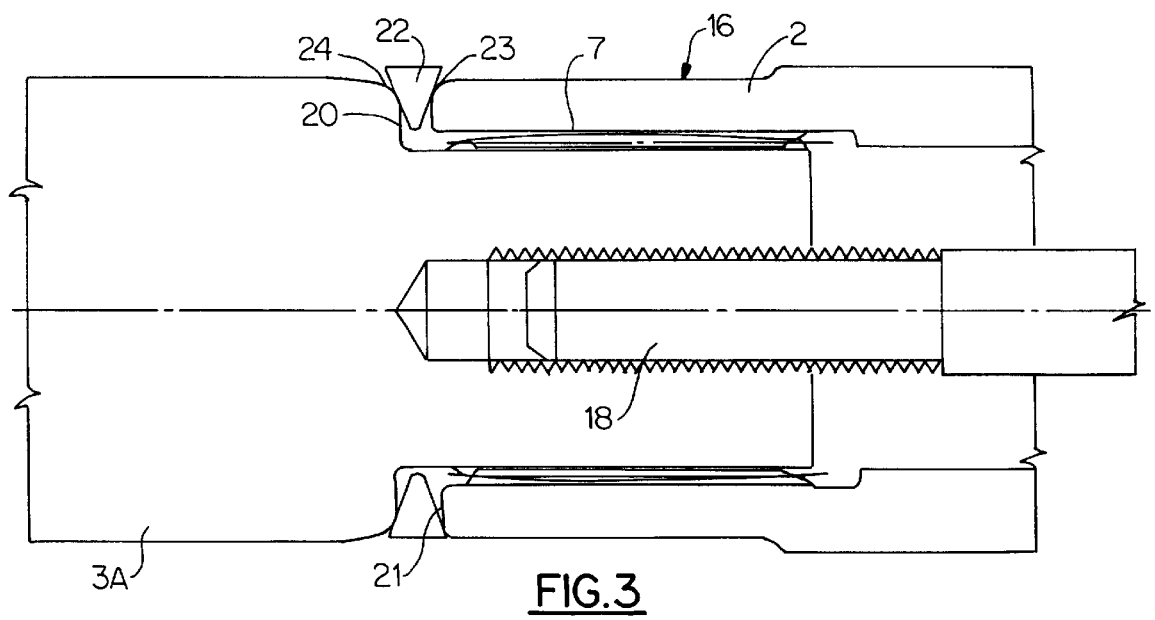
FIG. 3 is an enlarged representation of the connecting point between the pinion shaft and the side shaft with a spacer ring situated therebetween according to FIG. 1 including the assembly of a fastening element.
Figure 4:
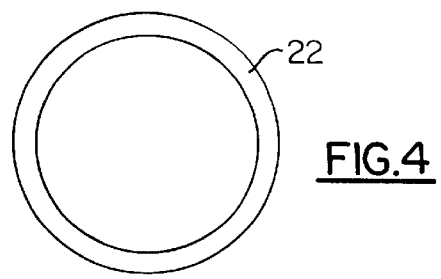
FIG. 4 is a planar view of the ring spacer.

In FIGS. 2 and 3 is shown an enlarged segment of the connection 7 with the spacer ring 22 according to FIG. 1. In FIG. 2 the connection 7 is shown prior to fastening of the side shaft 2 on the pinion shaft 3A by means of the bolt 18. FIG. 3 shows the position of the spacer ring 22 after fastening of the side shaft 2 on the pinion shaft 3A by the bolt 18.

The inner diameter of the spacer ring 22 is here designed in such a manner that the spacer ring 22 can be guided via the overlapping area 16 of the pinion shaft 3A up to the step 20. In the overlapping area 16, the outer diameter of the spacer ring 22 is designed larger than the outer diameter of the side shaft 2 in order that the front face 21 of the side shaft 2 abuts on a side face or flank 23 of the spacer ring 22.

During the assembly, due to the screwing of the bolt 18 into the pinion shaft pinion shaft 3A in such a manner that the front face 21 presses on the side surface 23 of the spacer ring 22, and the spacer ring 22 abuts on the step 20 by its side surface 24 lying opposite to the side surface 23.

The spacer ring 22 has in its cross-section a trapezoidal shape, the side surfaces 23, 24 forming an angle α, e.g. of 40°. The angle is dependent on the friction ratio and the admissible tensile strength of the spacer ring. The axial width of the spacer ring 22 here diminishes starting from its outer diameter toward its inner diameter.

Due to the tightening of the bolt 18, if the output spur gear 1 is more strongly pressed against the spacer ring 22, there originates, because of the inclined or conical side surfaces 23, 24 and as result of the non-parallel position of the front face 21 relative to the step 20, a radial force $F_r$ on the spacer ring 22 resulting from the axial screwing force. As long as the radial force $F_r$ is stronger than the static friction force $F_h$ of the front surface 21 on the side surface 23 and of the step 20 on the front surface 24, the spacer ring 22 is radially moved from its center until a balance of forces appears and the spacer ring 22 forms on both sides of the side surfaces 23, 24 a linear contact or contact line with the step 20 and the front surface 21. If the spacer ring 22 remains in this position, the bolt 18 can be screwed into a pre-defined tightening torque.

The pinion shaft 3A and the side shaft 2 with the output spur gear 1 are finally disposed aligned on a central axis, which ensures very quiet running during operation and thus a small load of the teeth and of the supports.

| Reference numerals | |
|---|---|
| 1 | output spur gear |
| 2 | side shaft |
| 3A | pinion |
| 4 | pinion shaft |
| 5 | differential |
| 6 | parking interlock gear |
| 7 | connection |
| 8 | output spur gear support |
| 9 | cylinder roller bearing |
| 10 | support of the pinion shaft |
| 11 | tapered roller bearing |
| 12 | tapered roller bearing |
| 13 | rollway body |
| 14 | cover |
| 15 | housing |
| 16 | overlapping area |
| 17 | splined shaft |
| 18 | fastening element |
| 19 | constriction |
| 20 | step |
| 21 | front face of the side shaft |
| 22 | spacer ring |
| 23 | side surface of the spacer ring |
| 24 | side surface of the spacer ring |

What is claimed is:

1. A front-axle output assembly of an automatic transmission comprising:
    an output spur gear (1) operatively connected with an input intermediate gear (4); and
    being connected for transmitting torque to a differential (5) having a pinion shaft (3A) disposed co-axially with the output spur gear (1), the pinion shaft (3A) having a pinion (3) engaged with said differential (5);
    said output spur gear (1) forming one piece with a side shaft (2);
    said side shaft (2) having connected with said pinion shaft (3A) by a positive connection (7) between a support (10) of said pinion (3) and said pinion shaft (3A) and an output spur gear support (8) in an area adjacent said support (10) of said pinion (3) and of said pinion shaft (3A); and
    a spacer ring (22) located axially between said pinion shaft (3A) and said side shaft (2) adjacent an overlapping area (16) providing said positive, connection (7).

2. The front-axle output assembly according to claim 1, wherein said spacer ring (22) has an inner diameter larger than the outer diameter of said pinion shaft (3A) in said overlapping area (16) and an outer diameter larger than the outer diameter of said side shaft (2), the cross section of said spacer ring (22) tapering axially inwardly from the outer diameter to the inner diameter.

3. The front-axle output assembly according to claim 1, wherein:

said side shaft (2) is at least in part a hollow shaft;

the overlapping area (16) of said pinion shaft (3A) and said side shaft (2) provide for pinion shaft (3A) to extend into said side shaft (2);

said pinion shaft (3A) has adjacent said overlapping area (16), facing said pinion (3), a step (20) providing stop surface for a face (21) of said side shaft (2).

4. The front-axle output assembly according to claim 1, wherein said pinion shaft (3A) and said side shaft (2) are removably axially connected by means of a fastening element (18).

5. The front-axle output assembly according to claim 4, wherein said fastening elelment is a bolt (18) and said side shaft (2) has in its interior a constriction (19) to abut a head of said bolt (18).

6. The front-axle output assembly according to claim 1, wherein said side shaft (2) one piece with a parking interlock gear (6).

7. The front-axle output assembly according to claim 1, wherein the material cross-section of said side shaft (2) tapers from said output spur gear support (8) downwardly to said overlapping area (16).

8. The front-axle output assembly according to claim 1, wherein said output spur gear support (8) has a cylinder roller bearing (9) located on a side of said output spur gear (1) remote from said pinion shaft (3A).

* * * * *